United States Patent [19]
Reinhold, Jr. et al.

[11] Patent Number: 5,331,815
[45] Date of Patent: Jul. 26, 1994

[54] IMPACT RESISTANT COMBUSTOR

[75] Inventors: James N. Reinhold, Jr., Cincinnati; Mark P. Hammerl, West Chester; Scott D. Zimmerle, Cincinnati, all of Ohio

[73] Assignee: General Electric Company, Cincinnati, Ohio

[21] Appl. No.: 108,150

[22] Filed: Aug. 17, 1993

Related U.S. Application Data

[63] Continuation of Ser. No. 855,408, Mar. 23, 1992, abandoned.

[51] Int. Cl.⁵ ............................................. F02C 1/00
[52] U.S. Cl. ................................. 60/748; 60/39.11; 60/756
[58] Field of Search ..................... 60/39.11, 737, 748, 60/752, 755, 756, 757

[56] References Cited

U.S. PATENT DOCUMENTS

| | | | |
|---|---|---|---|
| 2,742,762 | 4/1956 | Kuhring | 60/752 |
| 2,907,171 | 10/1959 | Lysholm | 60/737 |
| 2,933,895 | 4/1960 | Cheeseman | 60/757 |
| 4,365,470 | 12/1982 | Matthews et al. | 60/756 |
| 4,584,834 | 4/1986 | Koshoffer et al. | 60/737 |
| 4,686,823 | 8/1987 | Coburn et al. | 60/752 |
| 4,974,416 | 12/1990 | Taylor | 60/737 |

FOREIGN PATENT DOCUMENTS 0793325 4/1958 United Kingdom ............... 60/752

Primary Examiner—Richard A. Bertsch
Assistant Examiner—Michael I. Kocharov
Attorney, Agent, or Firm—Jerome C. Squillaro; Charles L. Moore, Jr.

[57] ABSTRACT

An impact resistant cowl structure for a gas turbine engine mounted in front of the combustor dome of the engine having a concave dish-like center for capturing incident debris which is bounded by a pair of forward protruding elbows that transition into outwardly and rearwardly extending mounting legs.

8 Claims, 3 Drawing Sheets

IMPACT RESISTANT COMBUSTOR

This application is a continuation of application Ser. No. 07/855,408 filed Mar. 23, 1992, now abandoned.

FIELD OF THE INVENTION

The present invention relates generally to gas turbine engine combustors and, more particularly, to a birdstrike resistant combustor dome.

BACKGROUND OF THE INVENTION

Combustors used in gas turbine engines, such as aircraft engines, conventionally include sheet metal combustion liners and sheet metal combustion dome assemblies. The combustion liners include coannular outer and inner combustion liners joined at their upstream ends by an annular dome for defining therein an annular combustion dome. The dome includes a plurality of circumferentially spaced carburetors for providing a fuel/air mixture into the combustor which is conventionally ignited for generating combustion gases. The combustor is supplied with compressed airflow from the compressor upstream thereof which subjects the dome to a pressure loading by the high velocity compressed airflow. In addition, the combustor structure is vibrationally active and subject to thermal expansion of the components during engine operation resulting in relative movement between the various components.

It is well known that during ground operation or during take-off at some airports, the engines exert a powerful suction effect in front of them, resulting in some instances in the ingestion of birds or other objects.

The combustor domes in present operation, when subjected to birdstrike to the engine core, have occasionally shown disengagement of the fuel nozzle from the swirler. The movement of the swirler, relative to the fuel nozzle, is due to the large bellmouth of the secondary swirler which supports the primary swirler but acts as a moment arm during impact. Such moment arm produces a moment about the center of the swirler, causing the swirler to rotate. The dome spectacle plate is then distorted allowing disengagement of the fuel nozzle.

OBJECTS AND SUMMARY OF THE INVENTION

It is, therefore, the primary object of the present invention to provide a new and improved impact resistant combustor structure for a gas turbine engine capable of providing reliable protection against the effects of birds or other objects striking the core engine.

It is another object of the present invention to provide a new and improved cowl structure for a gas turbine engine of an aircraft which is simple in its structure yet capable of providing reliable protection for the combustor dome structure against the impact of birds or other objects striking the core engine. It is still another object of the present invention to provide an impact resistant cowl structure placed in front of the combustor dome of a gas turbine engine which has a shape and geometry capable of deforming and absorbing the impact energy of a birdstrike, and is thereby capable of protecting the combustor dome. It is still a further object of the present invention to provide an impact resistant cowl structure placed in front of the combustor dome of a gas turbine engine which has a shape and geometry capable of capturing all the impacting bird or other debris, slowing down the debris by deforming, and filtering the debris through small air holes provided therein to be deposited into the dome for burning away therein.

Accordingly, the present invention in one aspect thereof provides an impact resistant cowl structure placed in front of the combustor dome of a gas turbine engine which has a shape and geometry capable of deforming and absorbing the impact energy of a birdstrike, and is thereby capable of protecting the combustor dome and assuring continued operation of the aircraft.

The invention in another aspect thereof provides an impact resistant cowl structure placed in front of the combustor dome of a gas turbine engine which has a shape and geometry capable of capturing substantially all the debris resulting from a bird or other object striking the core engine, slowing down the debris by deforming and, filtering the debris through small air holes formed therein to be deposited into the dome for burning away therein.

BRIEF DESCRIPTION OF THE DRAWINGS

The present invention will become more readily apparent from the following description of a preferred embodiment thereof, shown and illustrated by way of example, and described in reference to the accompanying drawings, in which.

DESCRIPTION OF THE PREFERRED EMBODIMENT

Figure 1:
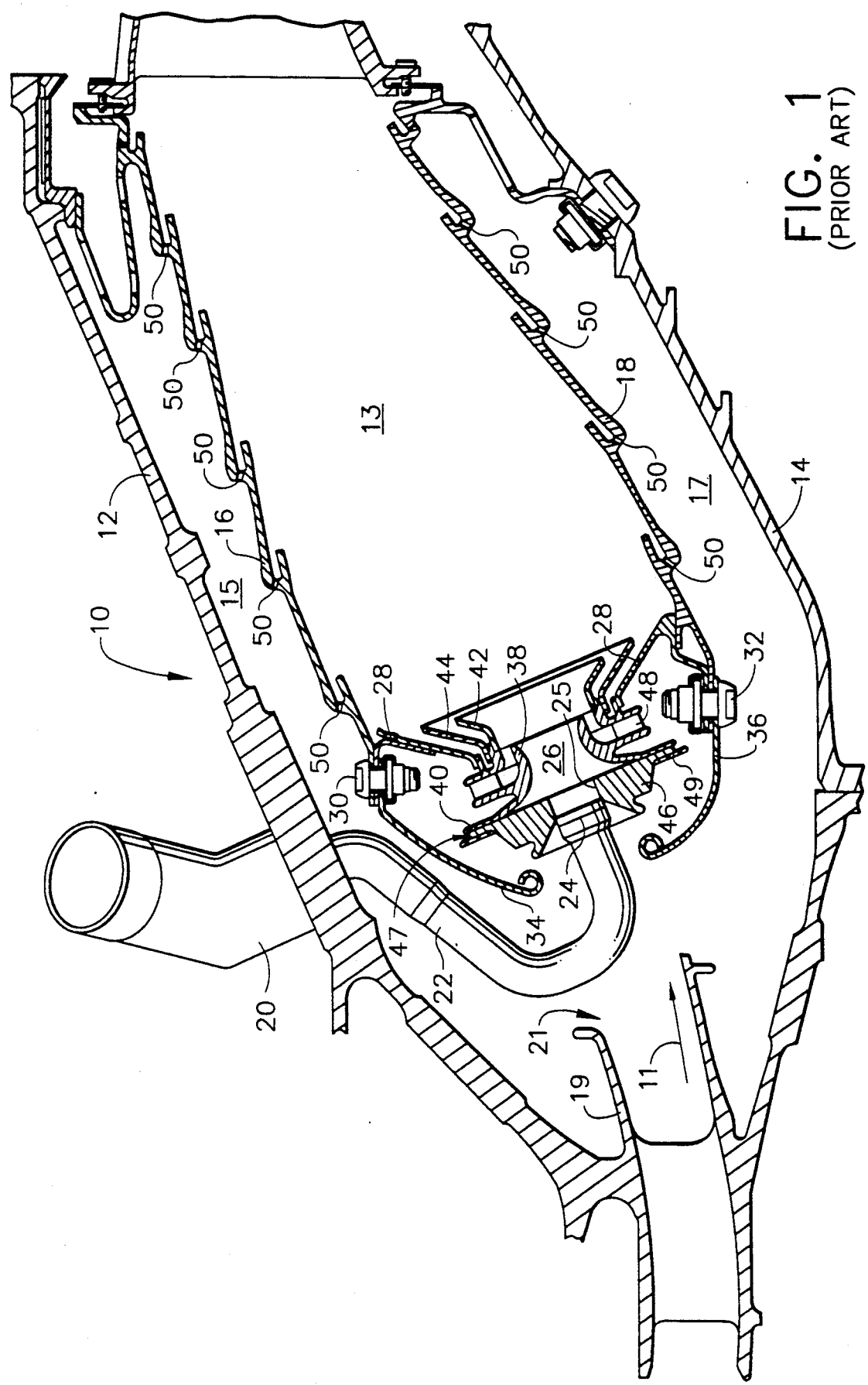
FIG. 1 illustrates schematically and partly in section the region of interest of the combustor of a gas turbine engine of the state of the art to which the present invention is applicable.

With reference to the drawings, particularly to FIG. 1, a state of the art annular type combustor 10 of an aircraft engine is depicted, which includes outer walls 12 and 14 within which annular combustion chamber 13 itself is defined by an outer liner 16, an inner liner 18, a dome plate 28, an outer cowl 34 and an inner cowl 36. Cowls 34, 36 are fixedly coupled to dome plate 28 and liners 16, 18, such as, by bolts 30, 32. Outer and inner liners 16 and 18 each include a plurality of cooling holes 50 which supply air to combustion chamber 13 while outer and inner passages 15 and 17 formed between outer walls 12, 14 and their respective adjacent liners 16 and 18 supply cooling air to the various cooling passages within the turbine, including the turbine blades. The fuel is supplied through a fuel nozzle valve 20 into a fuel nozzle stem 22 to a fuel nozzle 24, fuel nozzle 24 being removably inserted into fuel cup assembly 26. The compressed air arrives from the compressor (not shown) through a diffuser 19 having an outlet 21, as indicated by arrow 11, and streams under pressure toward combustion chamber 13. Fuel cup assembly 26 conventionally includes a primary swirler 46, a primary swirler flange 47, and a venturi 38 having a disc-shaped mounting flange 40. A retaining ring 49 is welded to flange 40 in order to hold flange 47 in sliding contact with flange 40. Fuel cup assembly 26 further includes a secondary swirler 48, a sleeve 42, and a splash plate 44.

The functions and mutual cooperation of the abovementioned elements of combustor 10 and of fuel cup assembly 26 are well known in the art and have been the subject of a large number of publications.

Experience has shown that a bird entering the engine does not exit the compressor spread over a 360° arc. Instead, the bird debris travels in a relatively straight line through the compressor and strikes the combustor in an area that is two or three fuel cups wide. This bird debris can strike inner cowl 36, causing inner cowl 36 to deform and hit primary swirler 46. Alternatively, the bird debris can pass between inner and outer cowls 36 and 34 and strike the large diameter "bellmouth" surface formed by retaining ring 49 and primary swirler flange 47. Loads on the large diameter bellmouth can create large bending moments in dome plate 28. The forces and moments transmitted to dome plate 28 can cause dome plate 28 to buckle. This distortion of dome plate 28 can result in rotation of fuel cup assembly 26 and disengagement of fuel nozzle 24 from aperture 25 provided in primary swirler 46. The rotation of the bellmouth and the buckling of dome plate 28 may occur about any number of axes, not just about the radial axis.

Figure 2:
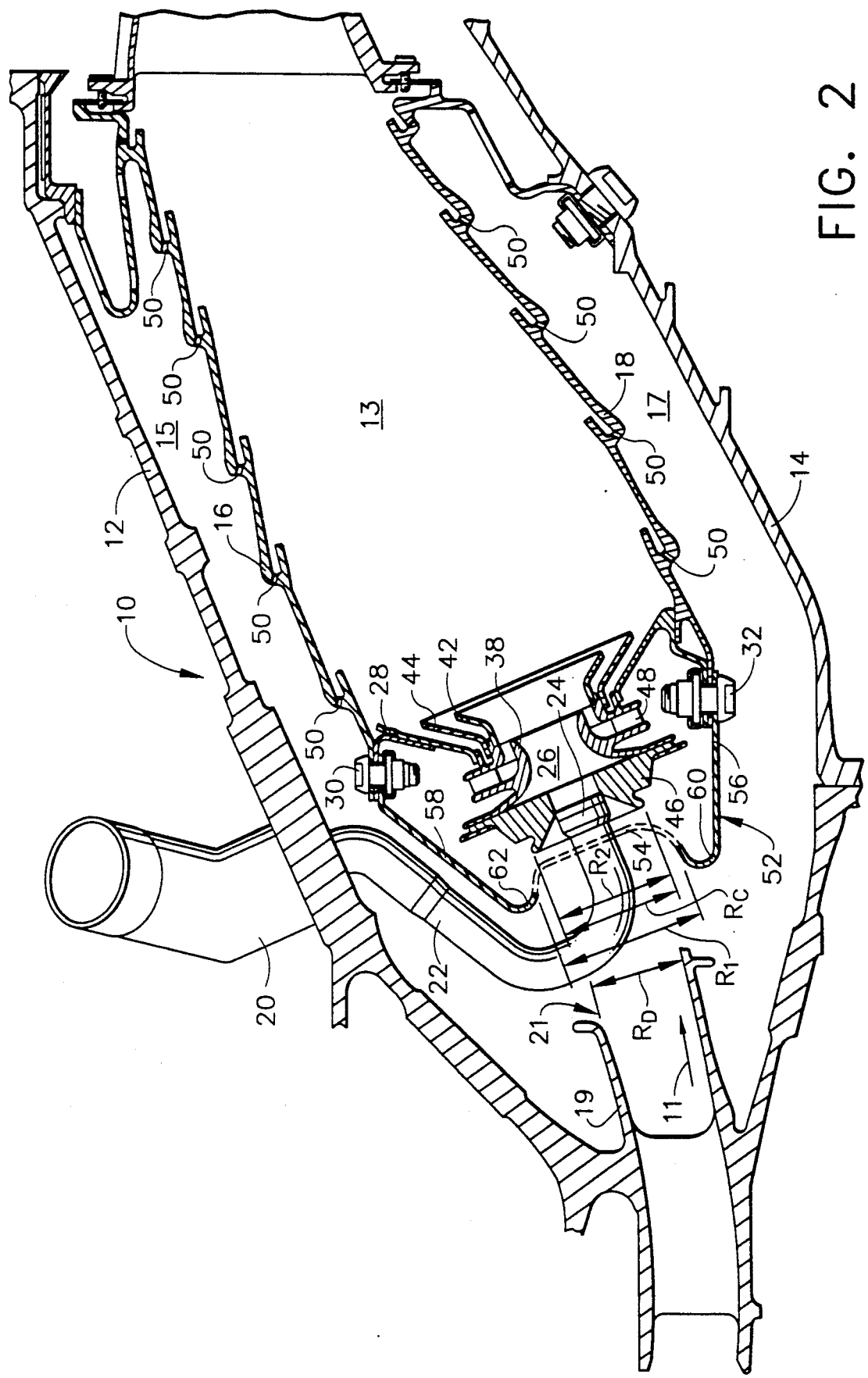
FIG. 2 illustrates schematically and partly in section the new and improved cowl structure mounted in front of the combustor dome.
Figure 3:
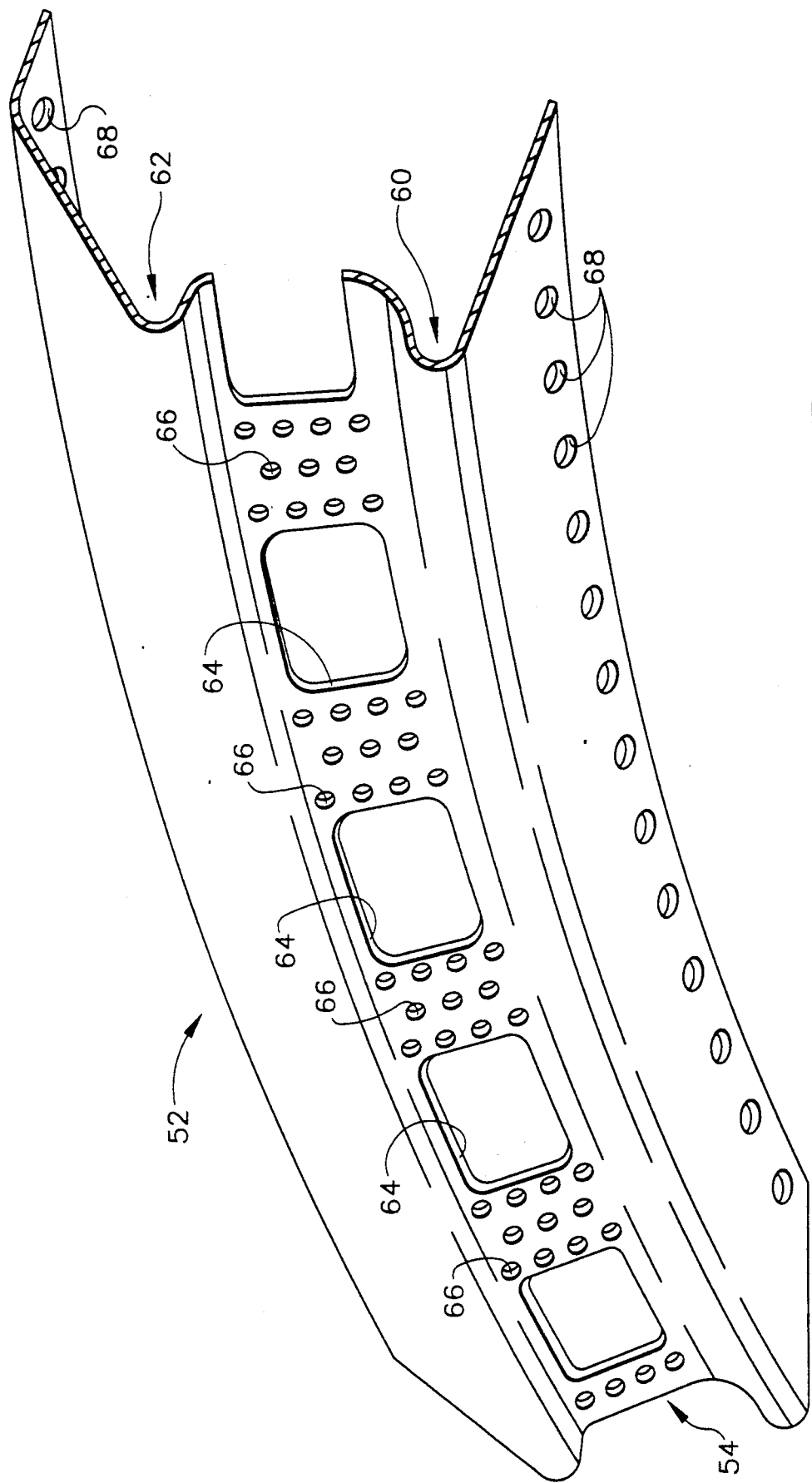
FIG. 3 illustrates isometrically a section of the new and improved cowl structure according to the present invention.

With reference to FIGS. 2 and 3, an energy absorbing cowl 52 according to the present invention is illustrated in its mounted state and isometrically, respectively. It is noted that FIG. 3 illustrates a cutaway portion of cowl 52 which can be manufactured either in segments or preferably in a continuous single ring form. The preferably one piece concave cowl 52 of the present invention includes a central dished or concave portion 54 which captures and holds bird or other foreign debris that passes through the compressor, and then slows down the debris by deforming under the impact. Accordingly, concave portion 54 is sized to be approximately the size of diffuser outlet 21 so as to capture substantially all debris flowing through diffuser 19. More specifically, the radial height $R_c$ of concave portion 54 is approximately equal to the radial height $R_d$ of diffuser 19. This is an advantageous and important feature of inventive cowl 52 since capturing and facilitating the burning away of the debris, as discussed in more detail below, prevents such debris from being deflected into passages 15 and 17. In addition, cowl 52 prevents clogging of holes 50 and the remaining cooling passages of the turbine. By contrast, a convex or blunt nosed cowl of the prior art would facilitate the above noted deflection of the incident debris into the passages 15 and 17. Concave portion 54 of cowl 52 is bounded by inner and outer elbows 60, 62 which smoothly transition into inner and outer leg portions 56 and 58, respectively. Inner and outer leg portions 56 and 58 flare radially outward in the downstream direction as best seen in FIG. 2. The edge portions of inner and outer leg portions 56 and 58 contain a plurality of bolt holes 68 to mate with bolts 30 and 32 for mounting purposes, as shown in FIG. 3. Window-like cutouts 64 serve as openings for mounting of fuel nozzle 24. Smaller holes 66 serve to receive auxiliary combustion air, as well as to screen or filter the debris during an impact. The bird debris which impacts the combustor 10 generally has a jello-like consistency. Accordingly, as a mass of bird debris hits cowl 52, it will deform cowl 52, lose its energy, and then feed through small cooling holes 66 where it is deposited into dome 28 and burned.

Concave cowl structure 52 not only is capable of capturing, holding and burning away incident debris, it is also capable of deforming under impact to absorb energy. This prevents damage to downstream components supported adjacent to combustor liners 16, 18, such as the high pressure turbine nozzle. Cutouts 64 preferably are sized larger (as shown by $R_1$ in FIG. 2) than the forward radius (as shown by $R_2$ in FIG. 2) of primary swirler 46 so that as cowl 52 deforms, it does not contact primary swirler 46. Instead, cowl 52 deforms around the forward portion of the primary swirler 46. Therefore, loads will not be transmitted into swirlers 46 and 48 or dome plate 28.

While there has been described herein what is considered to be a preferred embodiment of the present invention, other modifications of the invention shall be apparent to those skilled in the art from the teaching herein and, it is, therefore, desired to be secured in the appended claims all such modifications as fall within the true spirit and scope of the invention. In particular, it will be noted that the cowl 52 of the present invention may be modified to be implemented in annular combustors having more than one circumferential row of dome openings (i.e., double and triple annular combustors). The concave portion 54 of cowl 52 would extend radially across the circumferential rows of dome openings with window-like cutouts 64 and cooling holes 66 as shown in FIG. 3 herein.

Accordingly, what is desired to be secured by letters patent of the United States is the invention as defined and differentiated in the appended claims.

We claim:

1. A combustor dome assembly for a gas turbine engine, said combustor dome assembly being downstream of and receiving compressed air from a diffuser having an outlet of a specific area and radial height, comprising:
    (a) an annular dome plate having at least one circumferential row of spaced openings therethrough;
    (b) a fuel cup assembly attached to each of said dome plate openings, said fuel cup assembly including a venturi, a sleeve, a splash plate, a primary swirler and a secondary swirler;
    (c) a one-piece cowl connected to the radially inner and outer ends of said dome plate, said cowl including a central portion concave with respect to said fuel cup assembly which is centered upstream of an substantially in line with said fuel cup assembly, said concave central portion also being centered downstream of and substantially in line with said diffuser outlet; and
    (d) a pair of upstream protruding elbow portions bounding said concave central portion, wherein said elbow portions transition into leg portions which flare radially outward in the downstream direction;
    wherein said concave central portion has a radial height at least as great as said diffuser radial height in order to capture substantially all debris flowing through said diffuser outlet into said combustor dome assembly.

2. The combustor dome assembly of claim 1, said cowl central portion including a window-like cutout therein to allow fuel delivery means therethrough to said fuel cup assembly.

3. The combustor dome assembly of claim 2, said cowl central portion including a plurality of passages for providing auxiliary combustion air and filtering debris into said combustor dome assembly.

4. The combustor dome assembly of claim 2, wherein said window-like cutout has a radial extent larger than a forward radius of said primary swirler.

5. The combustor dome assembly of claim 1, wherein said cowl has a geometry defined by said central portion, said elbow portions and said leg portions which allows deformation of said cowl under impact loads of debris or other objects without contracting said primary swirler, whereby said impact loads are not transmitted to said dome plate.

6. The combustor dome assembly of claim 1, wherein said annular dome plate has inner and outer circumferential rows of spaced openings therethrough.

7. The combustor dome assembly of claim 1, further including an outer wall, an inner wall, an outer liner, and an inner liner, wherein an outer channel is defined between said outer wall and said outer liner and an inner channel is defined between said inner wall and said inner liner, said concave central portion being sized to prevent debris from entering said outer and inner channels.

8. The combustor dome assembly of claim 1, wherein the radial height of said diffuser outlet and the radial height of said concave central portion are substantially equal.

* * * * *